(12) United States Patent
Komori (10) Patent No.: US 12,308,141 B2
(45) Date of Patent: May 20, 2025

(54) WIRING MODULE AND ELASTIC WATERPROOFING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 38 days.

(21) Appl. No.: 18/010,110

(22) PCT Filed: Jun. 3, 2021

(86) PCT No.: PCT/JP2021/021130
§ 371 (c)(1),
(2) Date: Dec. 13, 2022

(87) PCT Pub. No.: WO2021/256271
PCT Pub. Date: Dec. 23, 2021

(65) Prior Publication Data
US 2023/0238158 A1     Jul. 27, 2023

(30) Foreign Application Priority Data

Jun. 19, 2020   (JP) ................................ 2020-106241

(51) Int. Cl.
*H01B 17/58*       (2006.01)
*H02G 15/013*      (2006.01)

(52) U.S. Cl.
CPC .......... *H01B 17/58* (2013.01); *H02G 15/013* (2013.01)

(58) Field of Classification Search
CPC ...... H01B 17/58; H01B 7/282; H02G 15/013; H02G 15/04; H02G 15/06
See application file for complete search history.

(56) References Cited

U.S. PATENT DOCUMENTS 2,722,667 A * 11/1955 Huston ................ H01R 13/627
                                                439/372
4,611,872 A *  9/1986 Ito ..................... H01R 13/5219
                                                439/587

(Continued)

FOREIGN PATENT DOCUMENTS

DE      10349440 A1 *  6/2005  ............. F16L 5/027
JP      H08-191528 A   7/1996

(Continued)

OTHER PUBLICATIONS

International Search Report issued on Aug. 24, 2021 for WO 2021/256271 A1 (4 pages).

*Primary Examiner* — William H. Mayo, III
*Assistant Examiner* — Rhadames Alonzo Miller
(74) *Attorney, Agent, or Firm* — Venjuris, P.C.

(57) ABSTRACT

One object is to be able to easily attach an elastic waterproofing member to a wiring member. A wiring module (10) includes a wiring member (20), and an elastic waterproofing member (30) in which a penetration accommodating portion (32) is formed that is capable of accommodating a portion in a longitudinal direction of the wiring member. A slit (36) is formed in the elastic waterproofing member from the outer periphery of the elastic waterproofing member to the penetration accommodating portion, and the slit is kept closed with the portion in the longitudinal direction of the wiring (Continued)

member accommodated in the penetration accommodating portion.

9 Claims, 6 Drawing Sheets

(56) References Cited

U.S. PATENT DOCUMENTS

| | | | | |
|---|---|---|---|---|
| 5,927,725 | A * | 7/1999 | Tabata | H01R 13/5205 174/152 G |
| 6,368,132 | B1 * | 4/2002 | Okayasu | H01R 13/5219 439/275 |
| 7,229,325 | B1 * | 6/2007 | Flynn | H01R 9/223 439/798 |
| 2002/0052141 | A1 * | 5/2002 | Hattori | H01R 13/5205 439/587 |
| 2002/0101041 | A1 * | 8/2002 | Kameyama | H01R 13/521 277/628 |
| 2003/0121691 | A1 * | 7/2003 | Inoue | F16L 37/0987 174/650 |
| 2003/0184088 | A1 * | 10/2003 | Takayanagi | F16L 37/0987 285/319 |
| 2003/0184089 | A1 * | 10/2003 | Takayanagi | F16L 37/0987 285/319 |
| 2004/0061332 | A1 * | 4/2004 | Takayanagi | F16L 37/0847 285/330 |
| 2004/0066034 | A1 * | 4/2004 | Takayanagi | F16L 3/1226 285/319 |
| 2004/0266270 | A1 * | 12/2004 | Miyazaki | H01R 4/46 439/660 |
| 2007/0207668 | A1 * | 9/2007 | Masuzaki | G02B 6/3897 439/587 |
| 2007/0267212 | A1 * | 11/2007 | Nachbauer | H01R 29/00 174/70 R |
| 2008/0014793 | A1 * | 1/2008 | Okumura | H01R 13/5205 439/587 |
| 2009/0176416 | A1 * | 7/2009 | Flynn | H01R 13/5216 439/798 |
| 2012/0149243 | A1 * | 6/2012 | Ohnishi | H01R 43/24 29/883 |
| 2012/0156927 | A1 * | 6/2012 | Shiga | H01R 13/5208 439/521 |
| 2014/0099810 | A1 * | 4/2014 | Scott | H01R 13/6273 439/183 |
| 2014/0335739 | A1 * | 11/2014 | Sato | H01R 13/641 439/680 |
| 2015/0140851 | A1 * | 5/2015 | Wang | H01R 13/6597 439/275 |
| 2015/0303592 | A1 * | 10/2015 | Tait | H01R 4/26 439/391 |
| 2016/0236125 | A1 * | 8/2016 | Umeno | H05K 5/0213 |
| 2017/0149170 | A1 * | 5/2017 | Tait | H01R 13/506 |
| 2017/0162299 | A1 * | 6/2017 | Komori | H01R 13/52 |
| 2018/0048108 | A1 * | 2/2018 | Takahashi | H01R 13/6463 |
| 2020/0194930 | A1 * | 6/2020 | Yamada | H01R 13/6215 |
| 2020/0224767 | A1 * | 7/2020 | Chikamatsu | F16J 15/3232 |
| 2020/0254944 | A1 * | 8/2020 | Hashimoto | B60R 16/0207 |
| 2022/0035102 | A1 * | 2/2022 | Zhu | G02B 6/3894 |

FOREIGN PATENT DOCUMENTS

| | | |
|---|---|---|
| JP | 2007-273861 A | 10/2007 |
| JP | 2014-143889 A | 8/2014 |

* cited by examiner

WIRING MODULE AND ELASTIC WATERPROOFING MEMBER

CROSS REFERENCE TO RELATED APPLICATIONS

This application is a national phase of PCT application No. PCT/JP2021/021130, filed on 3 Jun. 2021, which claims priority from Japanese patent application No. 2020-106241, filed on 19 Jun. 2020, all of which are incorporated herein by reference.

TECHNICAL FIELD

The present disclosure relates to a wiring module and an elastic waterproofing member.

BACKGROUND

Patent Document 1 discloses a rubber plug applied to a multi-core cable. The rubber plug has a sheath outer-fitting portion externally fitted on an end of a sheath in the multi-core cable, and also has a wire penetration portion having a plurality of through holes penetrated by a plurality of electric wires led out from the end of the sheath.

PRIOR ART DOCUMENT

Patent Document

Patent Document 1: JP 2016-010303 A

SUMMARY OF THE INVENTION

Problems to be Solved

As disclosed in Patent Document 1, a configuration in which electric wires penetrate through holes in a rubber plug is adopted to inhibit the ingress of water along a multi-core cable.

Here, it is desired that the wiring member can be easily passed through the through holes of the elastic waterproofing member.

Accordingly, one object of the present disclosure is to be able to easily attach an elastic waterproofing member to a wiring member.

Means to Solve the Problem

A wiring module of the present disclosure includes a wiring member, and an elastic waterproofing member in which a penetration accommodating portion is formed that is capable of accommodating a portion in a longitudinal direction of the wiring member, in which a slit is formed in the elastic waterproofing member from the outer periphery of the elastic waterproofing member to the penetration accommodating portion, and the slit is kept closed when the portion in the longitudinal direction of the wiring member is accommodated in the penetration accommodating portion.

Additionally, an elastic waterproofing member of the present disclosure is an elastic waterproofing member to be attached to a wiring member, in which a penetration accommodating portion is formed that is capable of accommodating a portion in a longitudinal direction of the wiring member, and a slit is formed from an outer periphery to the penetration accommodating portion.

Effect of the Invention

According to the present disclosure, an elastic waterproofing member can be easily attached to a wiring member.

DETAILED DESCRIPTION TO EXECUTE THE INVENTION

Description of Embodiments of the Present Disclosure

First, embodiments of the present disclosure will be listed and described.

A wiring module of the present disclosure is as follows.

(1) A wiring module including: a wiring member; and an elastic waterproofing member in which a penetration accommodating portion is formed that is capable of accommodating a portion in a longitudinal direction of the wiring member, in which a slit is formed in the elastic waterproofing member from the outer periphery of the waterproofing member to the penetration accommodating portion, and the slit is kept closed when the portion in the longitudinal direction of the wiring member is accommodated in the penetration accommodating portion. According to the present disclosure, a portion in the longitudinal direction of the wiring member is accommodated in the penetration accommodating portion through the slit. Therefore, the elastic waterproofing member is easily attached to the wiring member.

(2) In the wiring module of (1), the wiring member may include a plurality of linear wiring members and a covering member that covers the plurality of linear wiring members, and the plurality of linear wiring members may extend from an end of the covering member, the penetration accommodating portion may include a covering member accommodating recess that covers the end of the covering member and a plurality of penetration portions continuous with the covering member accommodating recess, the plurality of penetration portions may be provided so as to correspond to the plurality of linear wiring members, and the slit may include a base slit portion extending from the outer periphery of the elastic waterproofing member to the covering member accommodating recess, and a plurality of individual slit portions that branch off from the base slit portion and extend from the outer periphery of the elastic waterproofing member to the respective plurality of penetration portions. As a result, each of the end of the covering member and the plurality of linear wiring members can be accommodated in the covering member accommodating recess and the plurality of penetration portions via the slit so as to be waterproofed.

(3) In the wiring module of (1) or (2), the wiring member may include a linear wiring member and a deep-side linear wiring member, the penetration accommodating portion may include a penetration portion capable of accommodating a portion in a longitudinal direction of the linear wiring member, and a deep-side penetration portion capable of accommodating a portion in a longitudinal direction of the deep-side linear wiring member, the slit may be formed in a portion from the outer periphery of the elastic waterproofing member to the penetration portion, and deep-side slit may be formed in the elastic waterproofing member from the penetration portion to the deep-side penetration portion. Since the deep-side slit is formed from the penetration portion to the deep-side penetration portion, the number of slits extending to the outer periphery of the elastic waterproofing member can be reduced. This enhances the waterproofing performance.

(4) The wiring module of any one of (1) to (3) may further include an exterior member including a first exterior member and a second exterior member that can be joined together, in which, when the first exterior member and the second exterior member joined together, the elastic waterproofing member may be accommodated between the first exterior member and the second exterior member with the slit closed. The slit is kept closed by accommodating the elastic waterproofing member in the exterior member.

(5) In the wiring module of (4), the elastic waterproofing member may be set in the first exterior member with an outward portion of the slit on the outer periphery exposed to the outside from the first exterior member. As a result, with the elastic waterproofing member set on the first exterior member, a portion in the longitudinal direction of the wiring member can be accommodated in the penetration accommodating portion via the slit. Therefore, the elastic waterproofing member is easily attached to the wiring member with the elastic waterproofing member and the first exterior member held together.

(6) In the wiring module of (4) or (5), when the first exterior member and the second exterior member are joined together, the exterior member may exert a force to clamp the slit in the direction of closure. Since the slit can be closed more reliably, the waterproofing performance is improved.

Furthermore, an elastic waterproofing member of the present disclosure is as follows:

(7) An elastic waterproofing member to be attached to a wiring member, in which a penetration accommodating portion is formed that is capable of accommodating a portion in a longitudinal direction of the wiring member, and a slit is formed from an outer periphery to the penetration accommodating portion. According to the present disclosure, a portion in the longitudinal direction of the wiring member is easily accommodated in the penetration accommodating portion through the slit. Therefore, the elastic waterproofing member is easily attached to the wiring member.

(8) In the elastic waterproofing member of (7), the penetration accommodating portion may include a covering member accommodating recess that is open to one side and a plurality of penetration portions continuous with a deep side of the covering member accommodating recess, and the slit may include a base slit portion extending from the outer periphery of the elastic waterproofing member to the covering member accommodating recess, and a plurality of individual slit portions that branch off from the base slit portion and extend from the outer periphery of the elastic waterproofing member to the respective plurality of penetration portions. As a result, each of the end of the covering member and the plurality of linear wiring members can be separately waterproofed.

(9) In the elastic waterproofing member of (7) or (8), the penetration accommodating portion may include a penetration portion capable of accommodating a portion in a longitudinal direction of a linear wiring member of the wiring member, and a deep-side penetration portion capable of accommodating a portion in a longitudinal direction of a linear wiring member different from the linear wiring member of the wiring member, the slit may be formed in a portion from the outer periphery to the penetration portion of the elastic waterproofing member, and a deep-side slit may be formed from the penetration portion to the deep-side penetration portion. Since the deep-side slit is formed from the penetration portion to the deep-side penetration portion, the number of slits extending to the outer periphery of the elastic waterproofing member can be reduced. This enhances the waterproofing performance.

Details of Embodiments of Present Disclosure

Specific examples of the wiring module and the elastic waterproofing member of the present disclosure will be described below with reference to the drawings. The present disclosure is not limited by these examples but is indicated by the claims, and all changes that come within the claims and the meaning and range of equivalency of the claims are intended to be encompassed within the scope of the invention.

Embodiments

Figure 1:
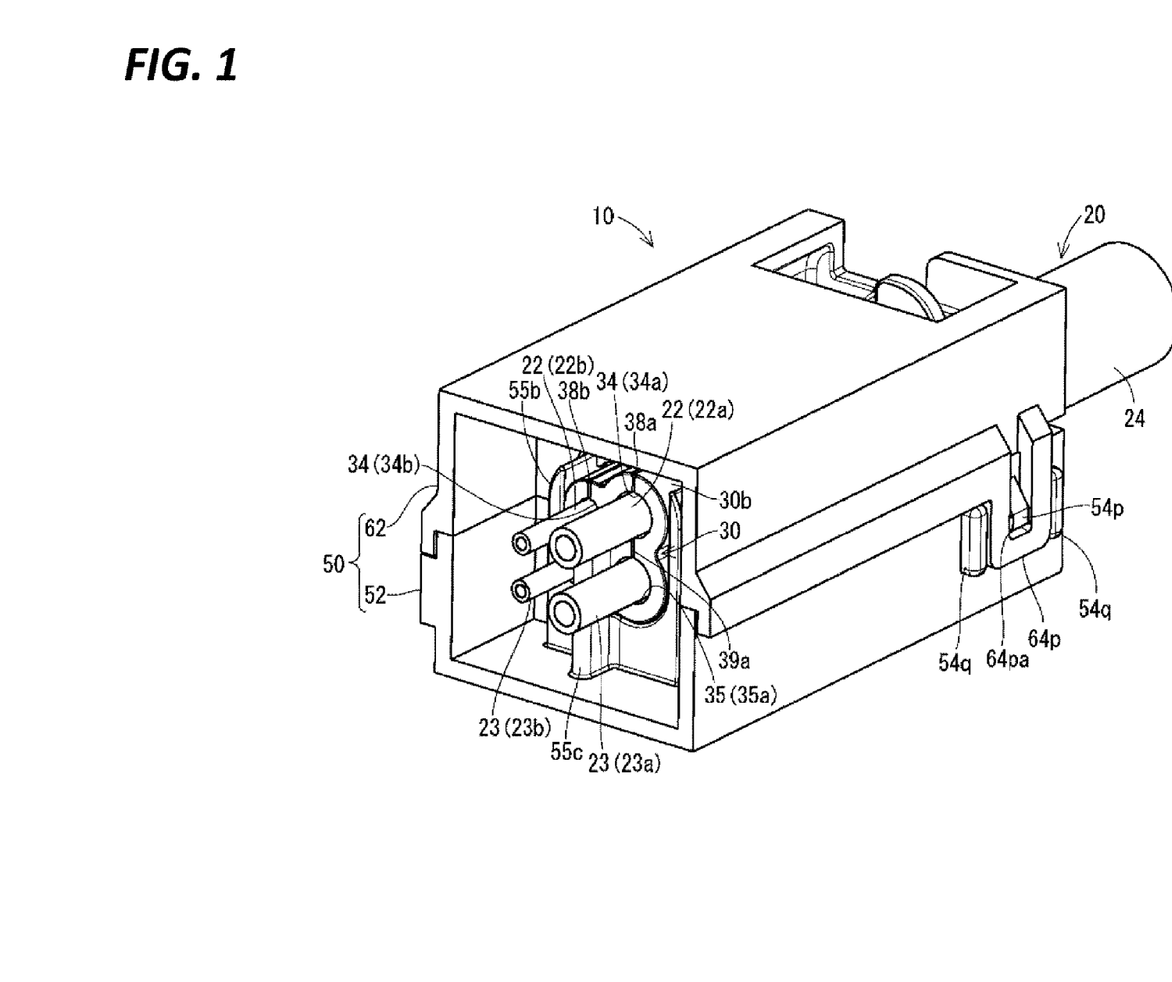
FIG. 1 is a perspective view showing a wiring module.
Figure 2:
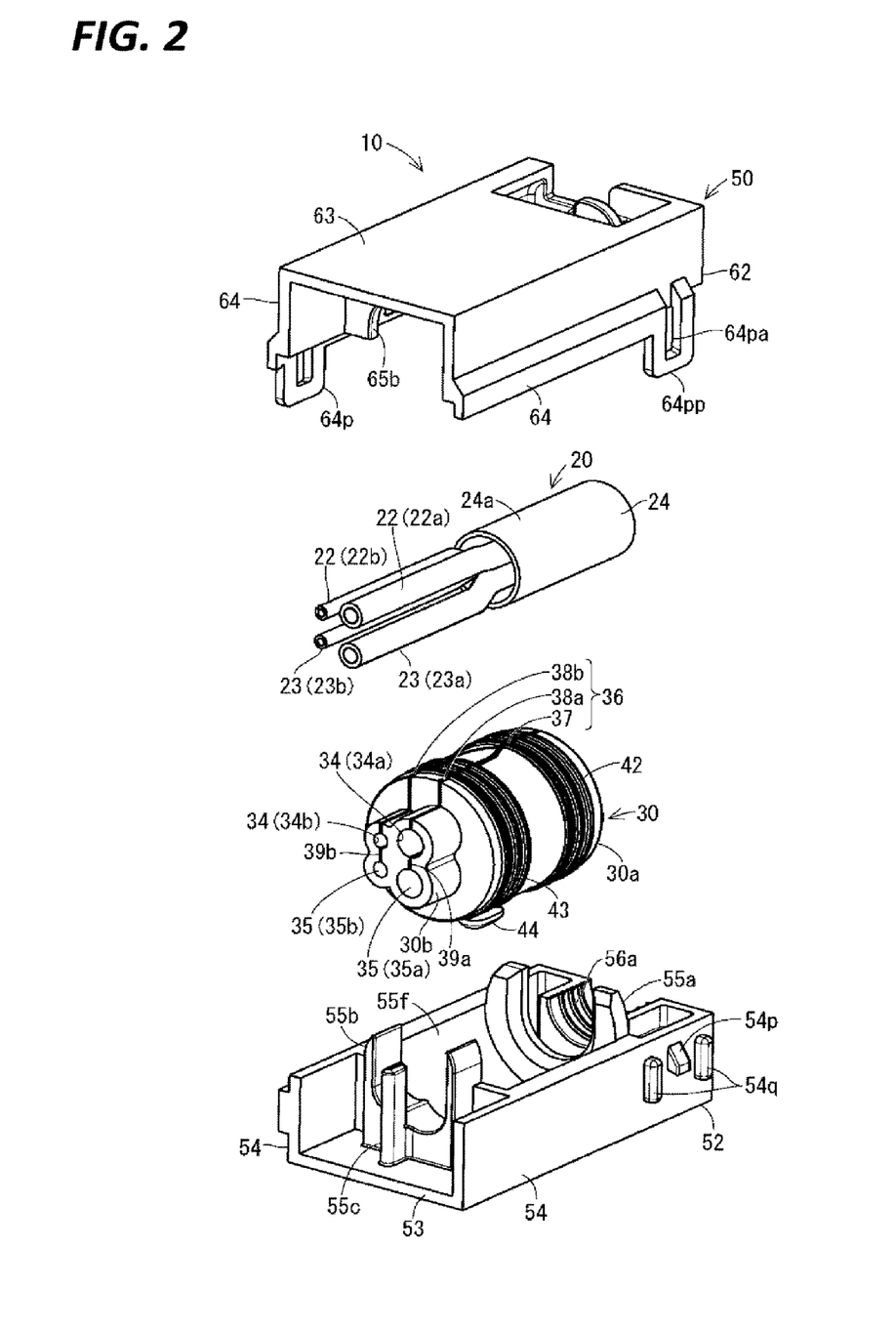
FIG. 2 is an exploded perspective view showing the wiring module.
Figure 3:
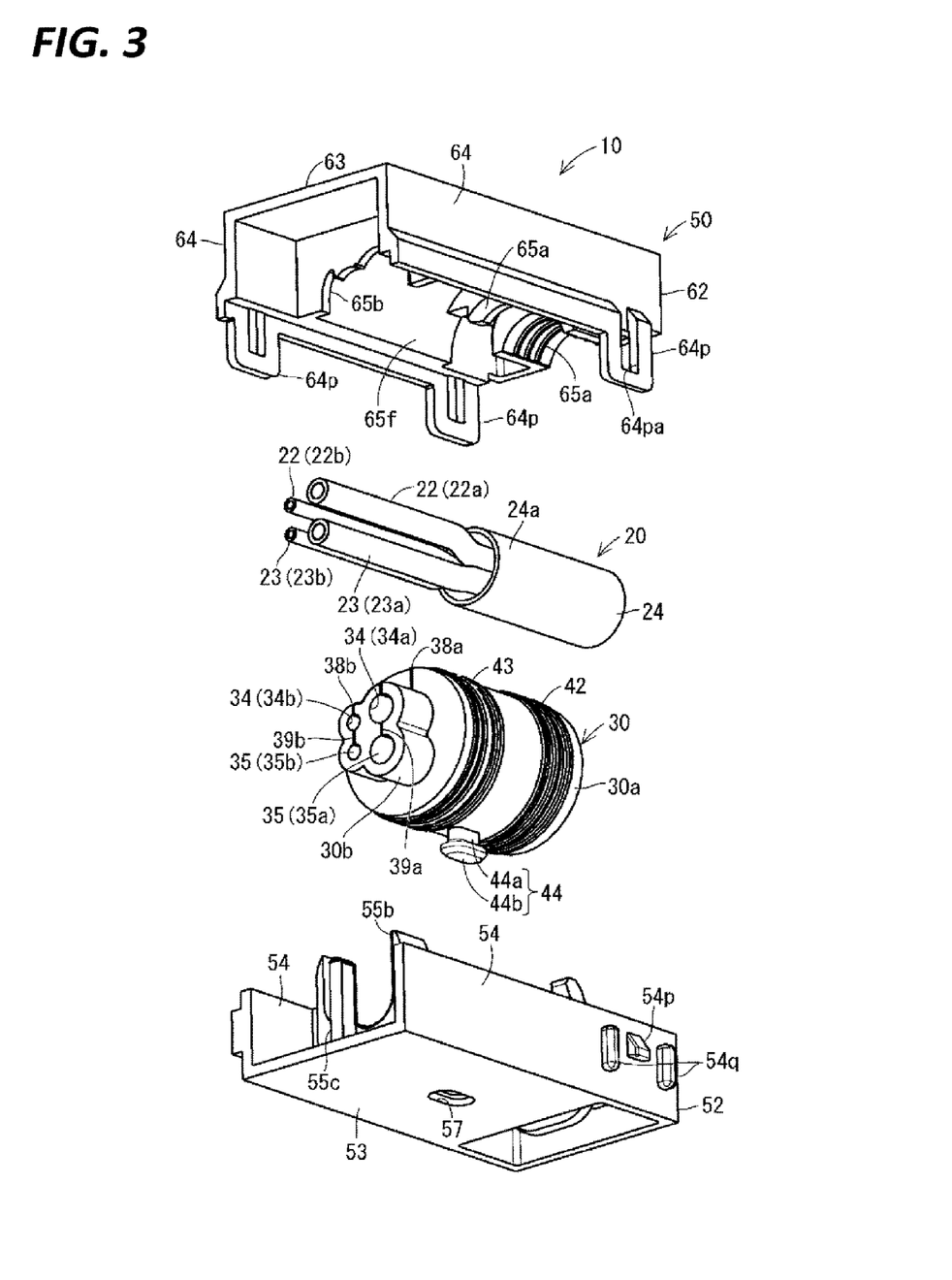
FIG. 3 is an exploded perspective view showing the wiring module.

A wiring module 10 according to an embodiment will be described hereinafter. FIG. 1 is a perspective view showing the wiring module 10. FIGS. 2 and 3 are exploded perspective views showing the wiring module 10. FIG. 2 is a perspective view from the side of a second exterior member 62, and FIG. 3 is a perspective view seen from the side of a first exterior member 52. In each figure, part of the wiring member 20 is shown.

The wiring module 10 includes a wiring member 20 and an elastic waterproofing member 30. In the present embodiment, the wiring module 10 also includes an exterior member 50. The wiring member 20 penetrates the elastic waterproofing member 30. The elastic waterproofing member 30 inhibits the ingress of water along the periphery of the wiring member 20. The elastic waterproofing member 30 is accommodated in the exterior member 50. In this way, the wiring member 20 is kept in a state of penetrating the elastic waterproofing member 30.

The following describes the configurations of the members.

The wiring member 20 includes linear wiring members 22. The wiring member 20 may include one linear wiring member 22 or a plurality of linear wiring members 22. In the present embodiment, an example is described in which the wiring member 20 includes a plurality (two in this case) of linear wiring members 22. The wiring member 20 further includes deep-side linear wiring members 23. Here, an example is described in which the wiring member 20 includes a plurality (two in this case) of deep-side linear wiring members 23. One linear wiring member 22 and one deep-side linear wiring member 23 may be provided in the wiring member 20. The deep-side linear wiring members 23 may be omitted.

The linear wiring members 22 and the deep-side linear wiring members 23 are linear media that transmit electricity, and are, for example, electric wires with a core wire and a covering that covers the core wire. In present embodiment, an example will be described in which the linear wiring members 22 and the deep-side linear wiring members 23 are general electric wires. The linear wiring members and the deep-side linear wiring members may be cables in which a plurality of electric wires are covered with a sheath. The linear wiring members and the deep-side linear wiring members may have an electromagnetic shielding layer that is braided or the like. The linear wiring members and the deep-side linear wiring members may be coaxial cables in which the periphery of an inner conductor is covered by an outer conductor whose periphery is covered by a sheath. The linear wiring members and the deep-side linear wiring members may be signal lines or power lines.

In the present embodiment, the plurality of linear wiring members 22 include linear wiring members with different thicknesses from each other. In the following description, for convenience of description, they are sometimes distinguished as a thicker linear wiring member 22a and a thinner linear wiring member 22b. The plurality of deep-side linear wiring members 23 includes deep-side linear wiring members of different thicknesses from each other. In the following description, for convenience of description, they are sometimes distinguished as a thicker deep-side linear wiring member 23a and a thinner deep-side linear wiring member 23b. Note that the thicker linear wiring member 22a and the thicker deep-side linear wiring member 23a are of the same thickness. Additionally, the thinner linear wiring member 22b and the thinner deep-side linear wiring member 23b are of the same thickness. Each of the linear wiring members and the deep-side linear wiring members may have any thickness.

The wiring member 20 includes a covering member 24 that covers portions in the direction of extension of the plurality of linear wiring members 22. The covering member 24 additionally covers portions in the direction of extension of the plurality of deep-side linear wiring members 23. The covering member 24 is, for example, a sheath formed through extrusion coating or the like of a softened and melted resin around the linear wiring members 22 and the deep-side linear wiring members 23. The covering 24 need only partially cover portions of the linear wiring members 22 and the deep-side linear wiring members 23 in the direction of extension. For example, the covering member 24 may be an adhesive tape spirally wound around and overlapping on the linear wiring members 22 and the deep-side linear wiring members 23. The covering member 24 may be a corrugated tube, a resin tube, a resin sheet, or the like, which covers the linear wiring members 22 and the deep-side linear wiring members 23. The portions of the linear wiring members 22 and the deep-side linear wiring members 23 covered by the covering member 24 are kept bundled by the covering member 24.

The plurality of linear wiring members 22 extends from one end of the covering member 24. The deep-side linear wiring members 23 also extend from the end of the covering member 24. In the present embodiment, two linear wiring members 22a and 22b extend from the end of the covering member 24, and two deep-side linear wiring members 23a and 23b also extend therefrom.

Figure 4:
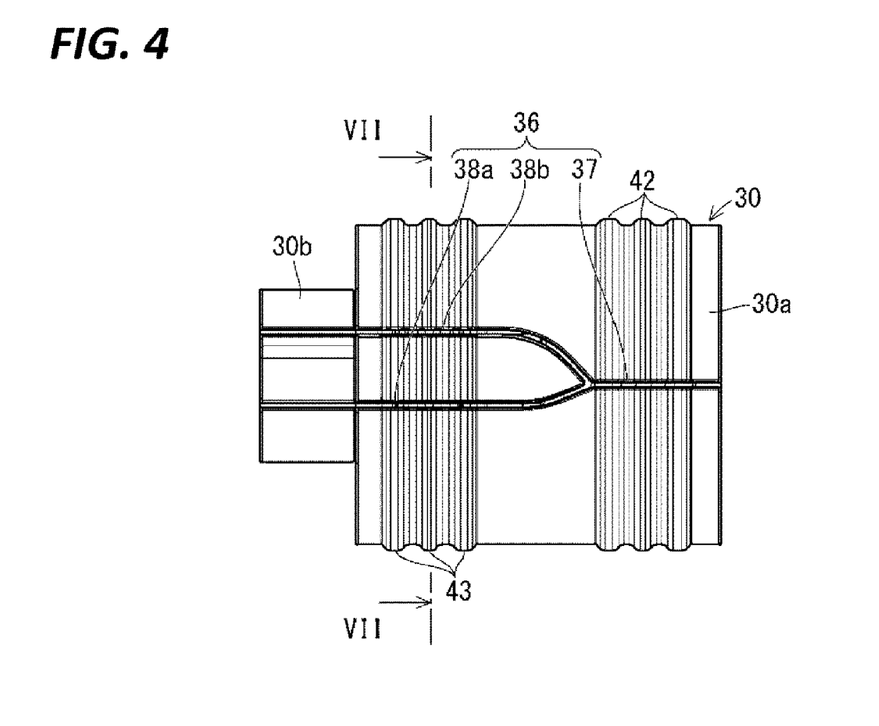
FIG. 4 is a plan view showing an elastic waterproofing member.
Figure 5:
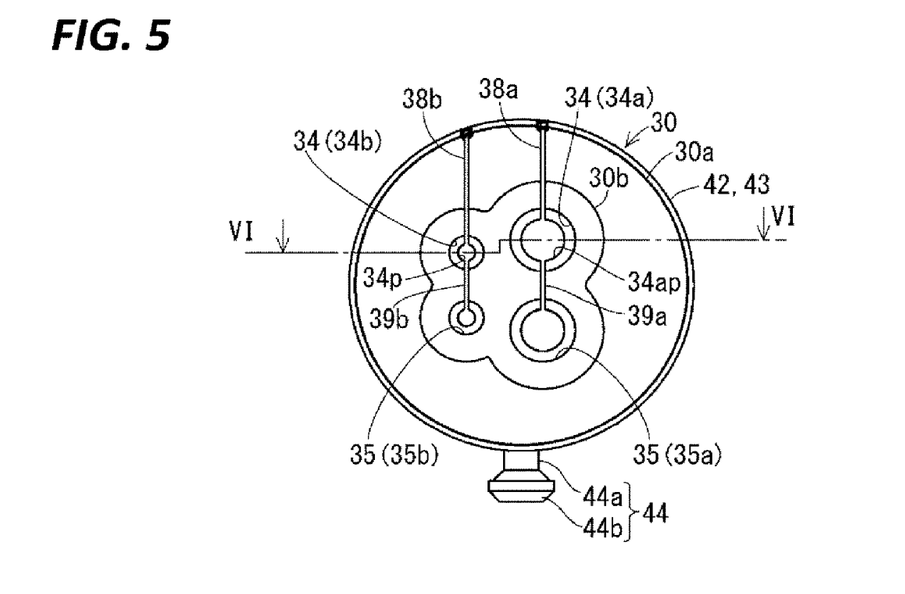
FIG. 5 is a front view showing the elastic waterproofing member.
Figure 6:
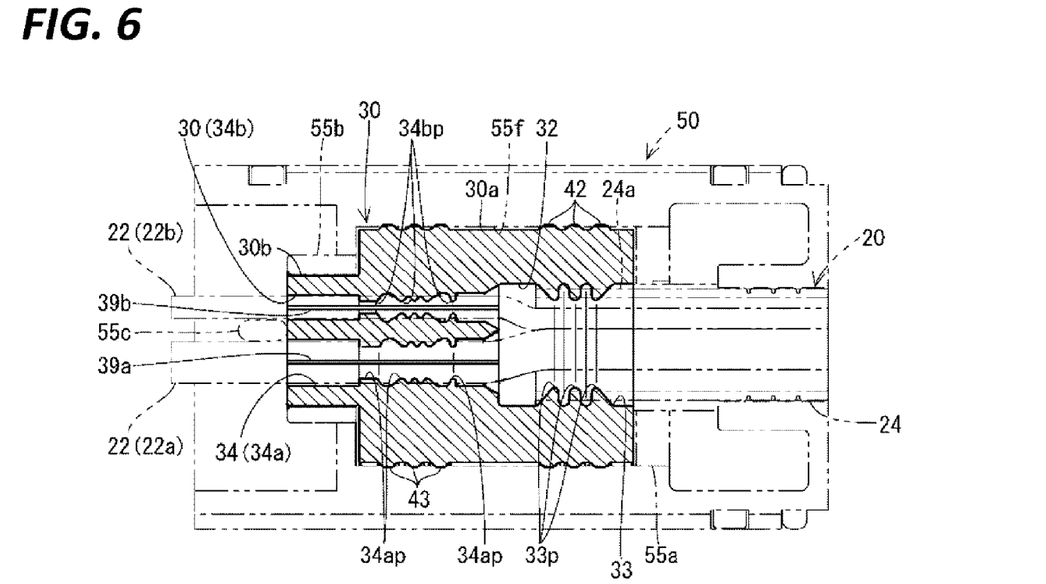
FIG. 6 is a cross-sectional view taken along line VI-VI of FIG. 5.
Figure 7:
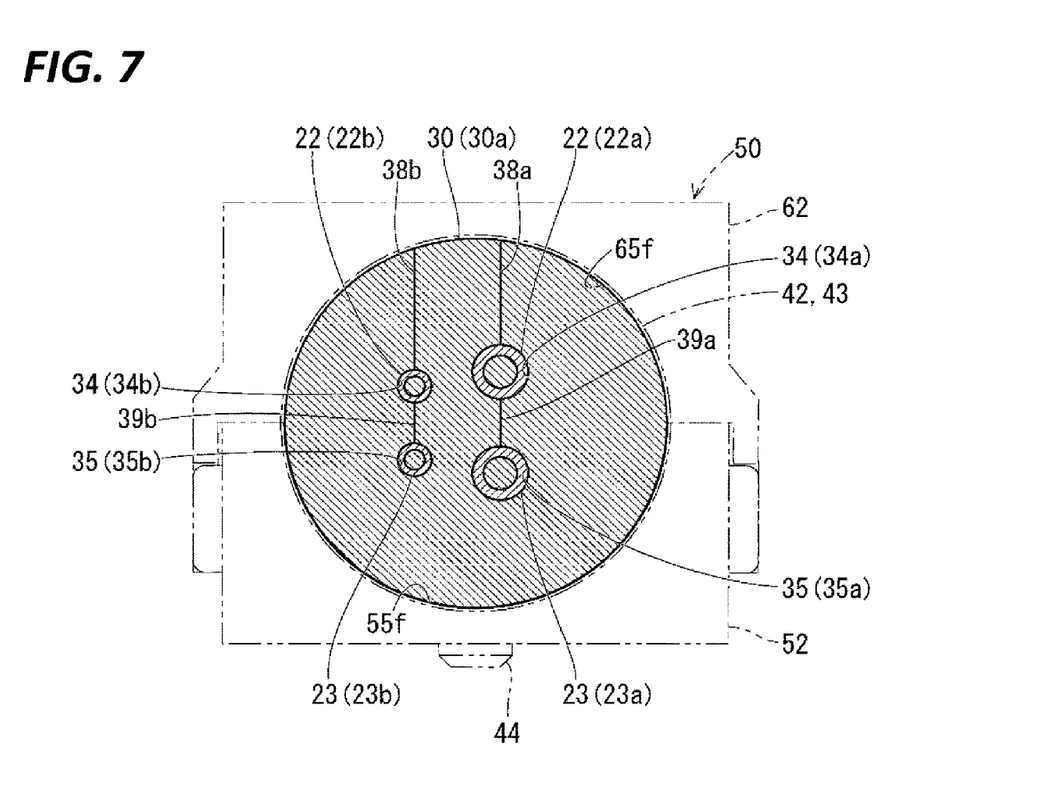
FIG. 7 is a cross-sectional view taken along line VII-VII of FIG. 4.

FIG. 4 is a plan view showing the elastic waterproofing member 30. FIG. 5 is a front view showing the elastic waterproofing member 30. FIG. 6 is a cross-sectional view taken along line VI-VI of FIG. 5. FIG. 7 is a cross-sectional view taken along line VII-VII of FIG. 4. In FIG. 6, the exterior member 50 is indicated by two-dot chain lines. FIG. 7 shows a cross-section of the wiring member 20 accommodated in the penetration accommodating portion 32 with the exterior member 50 shown in two-dot chain lines.

As shown in FIGS. 1 to 7, the elastic waterproofing member 30 is a member made of an elastic material such as silicone rubber. In the present embodiment, the elastic waterproofing member 30 is formed in a cylindrical shape. More specifically, the elastic waterproofing member 30 includes a cylindrical portion 30a and an extension portion 30b. The extension portion 30b is formed on the portion from which the linear wiring members 22 and the deep-side linear wiring members 23 extend with respect to the cylindrical portion 30a. The extension portion 30b is thinner than the cylindrical portion 30a. Here, the transverse cross-section of the cylindrical portion 30a (a cross-section on a plane perpendicular to the axis of the cylindrical portion 30a) is circular, and the outer edge of the transverse cross-section of the extension portion 30b is formed in a shape obtained by joining the outer edges of four circles. The partial circumferences defining the outer peripheral surface of the extension portion 30b are formed concentrically with later-described penetration portions 34 and deep-side penetration portions 35. The elastic waterproofing member 30 may also be formed in the shape of an elliptical column or a rectangular cylinder. The penetration accommodating portion 32 is formed in the elastic waterproofing member 30 (see FIG. 6). The penetration accommodating portion 32 penetrates the elastic waterproofing member 30 along the axial direction. The penetration accommodating portion 32 is configured to be able to accommodate a portion in the longitudinal direction of the wiring member 20.

In the present embodiment, an end 24a of the covering member 24 of the wiring member 20 and the portions of the linear wiring members 22 and the deep-side linear wiring members 23 that extend from the end 24a of the covering member 24 are accommodated in the elastic waterproofing member 30.

More specifically, the penetration accommodating portion 32 includes a covering member accommodating recess 33 and a plurality of penetration portions 34. In the present embodiment, the penetration accommodating portion 32 includes a plurality of deep-side penetration portions 35.

The covering member accommodating recess 33 is formed in a shape that covers the end 24a of the covering member 24. More specifically, the covering member accommodating recess 33 is formed as a cylindrical space recessed from one end in the axial direction of the elastic waterproofing member 30. Annular protrusions 33p protruding from the inner periphery are formed on the inner peripheral portion of the covering member accommodating recess 33 (see FIG. 6). The annular protrusions 33p are portions sometimes referred to as lips. The inner diameter of the annular protrusions 33p is formed smaller than the outer diameter of the covering member 24. Here, a plurality of (three) annular protrusions 33p are formed so as to be spread out in the axial direction of the covering member accommodating recess 33.

When the end 24a of the covering member 24 of the wiring member 20 is accommodated in the covering member accommodating recess 33, the leading end portions of the annular protrusions 33p come into areal contact with the periphery of the end portion 24a while being elastically deformed. As a result, it is possible to inhibit the movement of water along the outer peripheral surface of the covering portion 24.

The plurality of penetration portions 34 are through holes provided continuously with the covering member accommodating recess 33. Here, the plurality of penetration portions 34 are holes penetrating from the bottom of the covering member accommodating recess 33 to the other end of the elastic waterproofing member 30. The plurality of penetration portions 34 are provided so as to correspond to the plurality of linear wiring members 22. Here, two parallel penetration portions 34 are provided so as to correspond to the two linear wiring members 22. In the following description, the penetration portions are distinguished from each other using reference signs in some cases, with the penetration portion corresponding to the thicker linear wiring member 22a being referred to as the penetration portion 34a, and the penetration portion corresponding to the thinner linear wiring member 22b being referred to as the penetration portion 34b. The penetration portion 34a is larger than the penetration portion 34b.

Annular protrusions 34ap protruding toward the inner peripheral side are formed on the inner peripheral portion of the penetration portion 34a. The annular protrusions 34ap are portions sometimes referred to as lips. The inner diameter of the annular protrusions 34ap is formed smaller than the outer diameter of the linear wiring member 22a. Here, a plurality of annular protrusions 34ap are formed so as to be spread out in the axial direction of the penetration portion 34a. When the portion of the linear wiring member 22a on the covering member 24 side is accommodated in the penetration portion 34a, the leading end portions of the annular protrusions 34ap come into areal contact with the periphery of the linear wiring member 22a while being elastically deformed. As a result, it is possible to inhibit the movement of water along the outer peripheral surface of the linear wiring member 22a.

Similarly, annular protrusions 34bp protruding toward the inner peripheral side are formed on the inner peripheral portion of the penetration portion 34b. The annular protrusions 34bp are portions sometimes referred to as lips. The inner diameter of the annular protrusions 34bp is formed smaller than the outer diameter of the linear wiring member 22b. Here, a plurality of annular protrusions 34bp are formed so as to be spread out in the axial direction of the penetration portion 34b. When the portion of the linear wiring member 22b on the covering member 24 side is accommodated in the penetration portion 34b, the leading end portions of the annular protrusions 34bp come into areal contact with the periphery of the linear wiring member 22b while being elastically deformed. As a result, it is possible to inhibit the movement of water along the outer peripheral surface of the linear wiring member 22b.

The deep-side penetration portions 35 are through holes provided continuously with the covering member accommodating recess 33. Here, the plurality (two) of deep-side penetration portions 35 are holes penetrating from the bottom of the covering member accommodating recess 33 to the other end of the elastic waterproofing member 30. The plurality of deep-side penetration portions 35 are provided so as to correspond to the plurality of deep-side linear wiring members 23. Here, the plurality of deep-side penetration portions 35 are provided as two parallel portions so as to correspond to the two deep-side linear wiring members 23. In the following description, the penetration portion corresponding to the thicker deep-side linear wiring member 23a is sometimes referred to as the deep-side penetration portion 35a, and the penetration portion corresponding to the thinner deep-side linear wiring member 23b is sometimes referred to as the deep-side penetration portion 35b. The deep-side penetration portion 35a is larger than the deep-side penetration portion 35b.

The deep-side penetration portion 35a has the same shape as the above-described penetration portion 34a. The deep-side penetration portion 35b has the same shape as the above-described penetration portion 34b. The thicker deep-side penetration portion 35a is provided adjacent to the likewise thicker penetration portion 34a. The thinner deep-side penetration portion 35b is provided adjacent to the likewise thinner penetration portion 34b. Therefore, the thicker penetration portion 34a and the thicker deep-side penetration portion 35a are provided closer to one side of the elastic waterproofing member 30, and the thinner penetration portion 34b and the thinner deep-side penetration portion 35b are provided closer to the other side of the elastic waterproofing member 30.

With the end 24a of the covering member 24 accommodated in the covering member accommodating recess 33, the thicker linear wiring member 22a and the thicker deep-side linear wiring member 23a are accommodated in and penetrate the above-described penetration portion 34a and deep-side penetration portion 35a. Moreover, the thinner linear wiring member 22b and the thinner deep-side linear wiring member 23b are accommodated in and penetrate the penetration portion 34b and the deep-side penetration portion 35b. In this state, the end 24a of the covering member 24 and the portions of the linear wiring members 22 and the deep-side linear wiring members 23 that are close to the covering member 24 are waterproofed by the elastic waterproofing member 30. As a result, the ingress of water along the wiring member 20 is inhibited. In addition, the opening at the end 24a of the covering member 24 is located inward with respect to the waterproofed areas of the end 24a of the covering member 24 (especially the areas waterproofed by the covering member accommodating recess 33) and to the waterproofed areas of the portions of the linear wiring members 22 and the deep-side linear wiring member 23 that are close to the covering member 24 (especially the areas waterproofed by the penetration portions 34a and 34b and the deep-side penetration portions 35a and 35b). Therefore, the ingress of water through the opening of the end 24a of the covering member 24 is also inhibited.

Slits 36 are formed in the elastic waterproofing member 30 from the outer periphery of the elastic waterproofing member 30 to the penetration accommodating portion 32. The slits 36 are formed so as to extend over the entire direction of extension of the penetration accommodating portion 32. Therefore, a portion in the longitudinal direction of the wiring member 20 can be accommodated in the penetration accommodating portion 32 through the slits 36.

In the present embodiment, the slits 36 include a base slit portion 37 and a plurality of individual slit portions 38a and 38b.

The base slit portion 37 is a slit that extends from the outer periphery of the elastic waterproofing member 30 to the covering member accommodating recess 33. More particularly, the base slit portion 37 is formed in a portion near one end of the elastic waterproofing member 30. The base slit portion 37 is formed from the outer periphery of the elastic waterproofing member 30 toward the covering member accommodating recess 33 and along a direction parallel to the central axis of the elastic waterproofing member 30.

The plurality of individual slit portions 38a and 38b branch off and extend from the base slit portion 37 in a Y-shape. The plurality of individual slit portions 38a and 38b are formed from the outer periphery of the elastic waterproofing member 30 to the plurality of (in this case, two) penetration portions 34a and 34b. More specifically, the individual slit portion 38a includes a slit section formed from the outer periphery of the elastic waterproofing member 30 toward the penetration portion 34a and along a direction parallel to the central axis of the elastic waterproofing member 30. The individual slit portion 38b includes a slit section formed from the outer periphery of the elastic waterproofing member 30 toward the penetration portion 34b and along a direction parallel to the central axis of the elastic waterproofing member 30. The individual slit portions 38a and 38b and the base slit portion 37 are connected in a Y-shape when viewed from the outside of the elastic waterproofing member 30.

Deep-side slits 39a and 39b are also formed in the elastic waterproofing member 30 that extend from the penetration portions 34a and 34b to the deep-side penetration portions 35a and 35b. Here, the deep-side slit 39a is formed extending from the penetration portion 34a toward the deep-side penetration portion 35a and along the direction parallel to the axial direction of the elastic waterproofing member 30. Additionally, the deep-side slit 39b is formed extending from the penetration portion 34b toward the deep-side penetration portion 35b and along the direction parallel to the axial direction of the elastic waterproofing member 30.

Furthermore, the end 24a of the covering member 24 is accommodated in the covering member accommodating recess 33 via the base slit portion 37. The thicker deep-side linear wiring member 23a is also accommodated in the deep-side penetration portion 35a from the individual slit portion 38a via the penetration portion 34a and the deep-side slit 39a. Likewise, the thinner deep-side linear wiring member 23b is also accommodated in the deep-side penetration portion 35b from the individual slit portion 38b via the penetration portion 34b and the deep-side slit 39b. The thicker linear wiring member 22a is also accommodated in the penetration portion 34a via the individual slit portion 38a. Likewise, the thinner linear wiring member 22b is also accommodated in the penetration portion 34b via the individual slit portion 38b. As a result, the elastic waterproofing member 30 is attached to a longitudinal portion of the wiring member 20.

First outer annular protrusions 42 and second outer annular protrusions 43 are formed on the outer periphery of the elastic waterproofing member 30. The first outer annular protrusions 42 are formed on the portion of the outer periphery of the elastic waterproofing member 30 outside of the covering member accommodating recess 33. Preferably, the first outer annular protrusions 42 and the annular protrusions 33p are provided at least partially overlapping with each other in the axial direction of the elastic waterproofing member 30. The first outer annular protrusions 42 are formed in annular shapes that protrude along the circumferential direction of the outer peripheral side portion of the cylindrical portion 30a of the elastic waterproofing member 30. Here, a plurality of first outer annular protrusions 42 are formed. The second outer annular protrusions 43 are formed on the portion of the outer periphery of the elastic waterproofing member 30 outside of the penetration portions 34a and 34b and the deep-side penetration portions 35a and 35b. Preferably, the second outer annular protrusions 43 and the annular protrusions 34ap and 34bp are provided at least partially overlapping with each other in the axial direction of the elastic waterproofing member 30. The second outer annular protrusions 43 are formed in annular shapes that protrude along the circumferential direction of the outer peripheral portion of the cylindrical portion 30a of the elastic waterproofing member 30. Here, a plurality of second outer annular protrusions 43 are formed.

Additionally, a set protrusion 44 is formed in the portion of the elastic waterproofing member 30 opposite to where the slits 36 are formed. The set protrusion 44 includes a base 44a and a head 44b. The base 44a protrudes from the outer periphery of the elastic waterproofing member 30. The head 44b protrudes toward the outer peripheral side of the base 44a from the leading end of the base 44a. The head 44b is formed in a shape that is not circular, such as an oval shape, for example. This head 44b is fitted into a set recess 57 in the exterior member 50.

As described above, when a portion in the longitudinal direction of the wiring member 20 is accommodated in the penetration accommodating portion 32, the slits 36 are kept closed. In the present embodiment, the slits 36 are kept closed by the exterior member 50.

The exterior member 50 is a member capable of fulfilling a role of covering the periphery of the elastic waterproofing member 30 and keeping the slits 36 closed. In the present embodiment, the exterior member 50 includes a first exterior member 52 and a second exterior member 62 that can be joined together. When the first exterior member 52 and the second exterior member 62 are joined together, the elastic waterproofing member 30 is accommodated therebetween. The force that tends to keep the first exterior member 52 and the second exterior member 62 in the joined state compresses the elastic waterproofing member 30, thereby keeping the slits 36 closed.

More specifically, the first exterior member 52 and the second exterior member 62 are both members made of a resin or the like.

The first exterior member 52 includes a bottom plate portion 53 and a pair of side wall portions 54. The bottom plate portion 53 is formed in the shape of a square plate. The pair of side wall portions 54 are provided in a standing manner on both sides of the bottom plate portion 53. Joining protrusions 54p are formed on the external surfaces of the side wall portions 54. The joining protrusions 54p are formed in a shape whose protruding dimension gradually decreases toward the leading end on the side wall portion 54. Guide protrusions 54q are formed on both lateral sides of the joining protrusions 54p. The guide protrusions 54q are formed in an elongated shape extending from a base end toward a leading end on the side wall portions 54.

A waterproofing member split holding surface 55f having a half-circumferential surface shape is formed in an intermediate portion in the longitudinal direction of the bottom plate portion 53. A longitudinally-split half portion of the cylindrical portion 30a of the elastic waterproofing member 30 is accommodated in the waterproofing member split holding surface 55f.

A first positioning portion 55a is provided at one end of the waterproofing member split holding surface 55f. The first positioning portion 55a is formed in a U-shape protruding inward relative to the inner peripheral surface of the waterproofing member split holding surface 55f. A recess in which the covering member 24 can be disposed is provided in the first positioning portion 55a. A half-cylindrical holding portion 56a that can accommodate the covering member 24 is formed at one end of the bottom plate portion 53. The half-cylindrical holding portion 56a is positioned outside of the first positioning portion 55a. Protrusions are formed on the inner peripheral surface of the half-cylindrical holding portion 56a along its circumferential direction. Of the portion of the wiring member 20 that extends out of the elastic waterproofing member 30, the covering member 24 passes through the first positioning portion 55a and is held in the half-cylindrical holding portion 56a.

A second positioning portion 55b is provided at the other end of the waterproofing member split holding surface 55f. The second positioning portion 55b is formed in a U-shape protruding inward relative to the inner peripheral surface of the waterproofing member split holding surface 55f. A recess in which the extension portion 30b of the elastic waterproofing member 30 can be disposed is provided in the second positioning portion 55b. A partition 55c passing an intermediate portion in the width direction of the second positioning portion 55b protrudes from the bottom plate portion 53 on the outside of the second positioning portion 55b. Of the portion of the linear wiring members 22 and the deep-side linear wiring members 23 that extend out of the elastic waterproofing member 30, the thicker linear wiring member 22a and the thicker deep-side linear wiring member 23a are separated from the thinner linear wiring member 22b and the thinner deep-side linear wiring member 23b by the partition 55c as they protrude outward.

A set recess 57 is formed in the waterproofing member split holding surface 55f of the bottom plate portion 53. The set recess 57 is formed in a shape in which the above-described set protrusion 44 can be fitted. Here, the set recess 57 is formed in an oval shape conforming to the set protrusion 44. The set recess 57 need only be recessed in a view from the waterproofing member split holding surface 55f, and may be a bottomed hole or a through hole. Here, the set recess 57 is a through hole penetrating the waterproofing member split holding surface 55f to the outside.

The elastic waterproofing member 30 is set in the above-described waterproofing member split holding surface 55f with the set protrusion 44 fitted in the set recess 57. In this state, approximately half of the elastic waterproofing member 30 on the set protrusion 44 side is accommodated in the waterproofing member split holding surface 55f. In this state, one end face of the elastic waterproofing member 30 is in contact with the first positioning portion 55a. Also, the extension portion 30b of the elastic waterproofing member 30 is accommodated in the second positioning portion 55b, and an outward step at the boundary between the cylindrical portion 30a and the extension portion 30b of the elastic waterproofing member 30 is in contact with the second positioning portion 55b. As a result, the elastic waterproofing member 30 is positioned in its axial direction with respect to the first exterior member 52. The slits 36 are formed in the portion of the elastic waterproofing member 30 opposite to the set protrusion 44. As a result, the outward portions of the slits 36 on the outer periphery of the elastic waterproofing member 30 are exposed to the outside on the opposite side to the bottom plate portion 53. Therefore, a portion of the wiring member 20 can be accommodated in the penetration accommodating portion 32 of the elastic waterproofing member 30 through the slits 36 with respect to the elastic waterproofing member 30 set in the first exterior member 52.

The second exterior member 62 includes a ceiling plate portion 63 and a pair of side wall portions 64. Similar to the above-described bottom plate portion 53, the ceiling plate portion 63 is formed in the shape of a rectangular plate. The pair of side wall portions 64 protrude from both sides of the ceiling plate portion 63. Joining recesses 64pa are formed on the external surfaces of the side wall portions 64. Here, joining elongated pieces 64p are formed from the external surfaces of the side wall portions 64 toward the leading ends thereof. The joining recesses 64pa, in which the above-described joining protrusions 54p can be disposed, are formed at the leading ends of the joining elongated pieces 64p. When the second exterior member 62 is disposed on top of the first exterior member 52, the leading edges of the pair of the side wall portions 54 and the leading edges of the pair of side wall portions 64 are disposed opposing each other. Note that the overlapping pieces on the leading ends of the pair of side wall portions 64 are fitted on the outside of the leading edges of the pair of side wall portions 54. In this state, the leading ends of the joining elongated pieces 64p go over the joining protrusions 54p, and the joining protrusions 54p fit in the joining recesses 64pa. As a result, the joining protrusions 54p are caught and retained in the joining elongated pieces 64pa, whereby the first exterior member 52 and the second exterior member 62 are kept in the joined state.

A waterproofing member split holding surface 65f having a half-circumferential surface shape is formed in an intermediate portion in the longitudinal direction of the ceiling plate portion 63. A longitudinally-split half portion of the cylindrical portion 30a of the elastic waterproofing member 30 is accommodated in the waterproofing member split holding surface 65f. The cylindrical portion 30a of the elastic waterproofing member 30 is accommodated in the cylindrical space defined by the above-described waterproofing member split holding surface 55f and waterproofing member split holding surface 65f.

When the first exterior member 52 and the second exterior member 62 are joined together, the distance between the deep portion of the waterproofing member split holding surface 55f and the deep portion of the waterproofing member split holding surface 65f is smaller than the diameter of the first outer annular protrusions 42 and the second outer annular protrusions 43 on the cylindrical portion 30a. Furthermore, the radius of curvature of the waterproofing member split holding surfaces 55f and 65f is smaller than the radius of the first outer annular protrusions 42 and the second outer annular protrusions 43 on the cylindrical portion 30a. As a result, when the first outer annular protrusions 42 and the second exterior member 62 are joined together, a contractive force acts on the first outer annular protrusions 42 and the second outer annular protrusions 43 of the cylindrical portion 30a. This contractive force acts on the elastic waterproofing member 30 as a force to clamp the slits 36 in the direction of closure.

A first positioning portion 65a is provided at one end of the waterproofing member split holding surface 65f. The first positioning portion 65a is formed in an arc shape protruding inward relative to the inner peripheral surface of the waterproofing member split holding surface 65f. When the first exterior member 52 and the second exterior member 62 are joined together, the first positioning portions 55a and 65a come into contact with the annular area on one end face of the elastic waterproofing member 30 so as to position the elastic waterproofing member 30. A half-cylindrical holding portion 66a that has the same configuration as the half-cylindrical holding portion 56a is formed on one end of the ceiling plate portion 63. When the first exterior member 52 and the second exterior member 62 are joined together, the half-cylindrical holding portions 56a and 66a sandwich and hold the covering member 24.

A partition wall portion 65b is provided at the other end of the waterproofing member split holding surface 65f. A recess in which the above-described second positioning portion 55*b* and extension portion 30*b* can be disposed is provided in the partition wall portion 65*b*. When the first exterior member 52 and the second exterior member 62 are joined together, the second positioning portion 55*b* and the extension portion 30*b* are disposed in the recess in the partition wall portion 65*b*. In this state, the partition wall portion 65*b* partitions the exterior member 50 into inside and outside spaces.

An exemplary method of manufacturing the wiring module 10 thus configured will be described.

A wiring member 20 with linear wiring members 22 and deep-side linear wiring members 23 extending from one end of a covering member 24 is prepared.

Figure 8:
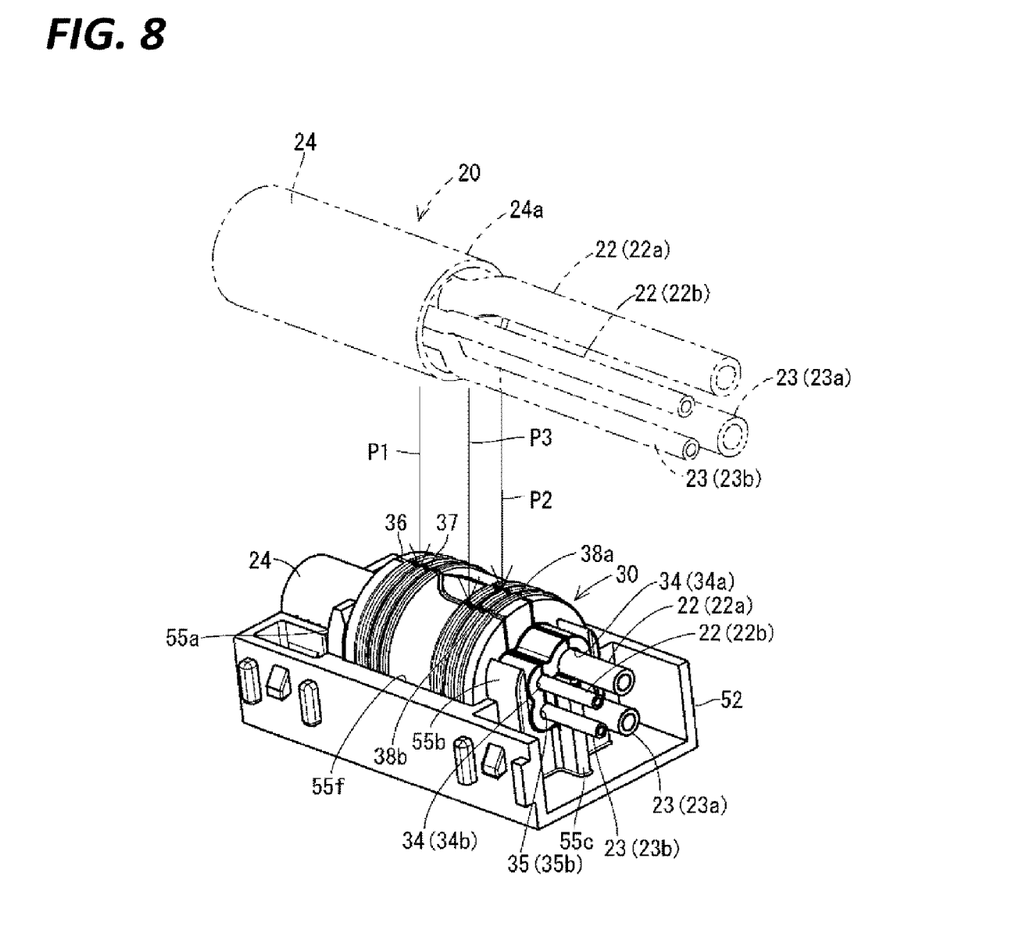
FIG. 8 is a perspective view showing how the elastic waterproofing member is set in a first exterior member.

The elastic waterproofing member 30 is set in the first exterior member 52 so as to fit the set protrusion 44 in the set recess 57. In this state, as shown in FIG. 8, the portion of the elastic waterproofing member 30 where the slits 36 are formed faces opposite to the bottom plate portion 53. Therefore, the outward openings of the slits 36 are exposed to the side opposite to the bottom plate portion 53. An area that is approximately half of the elastic waterproofing member 30 on the set protrusion 44 side is accommodated in the waterproofing member split holding surface 55*f* of the first exterior member 52, and the portion on the side opposite thereto is exposed to the outside. Therefore, the elastic waterproofing member 30 is capable of elastically deforming so as to widen the slits 36.

In the above-described state, the end 24*a* of the covering member 24 is pushed into the base slit portion 37 so as to be accommodated in the covering member accommodating recess 33 (see the arrow P1 in FIG. 8). Furthermore, the deep-side linear wiring members 23*a* and 23*b* are pushed into the individual slit portions 38*a* and 38*b* (see the arrows P2 and P3 in FIG. 8) and accommodated in the deep-side penetration portions 35*a* and 35*b* via the penetration portions 34*a* and 34*b* and the deep-side slits 39*a* and 39*b*. Subsequently, the linear wiring members 22*a* and 22*b* are pushed into the individual slit portions 38*a* and 38*b* and then accommodated in the penetration portions 34*a* and 34*b*. This results in part of the wiring member 20 being accommodated in the penetration accommodating portion 32 of the elastic waterproofing member 30, that is, the elastic waterproofing member 30 being attached to the wiring member 20.

Subsequently, the second exterior member 62 is disposed on the first exterior member 52 and the elastic waterproofing member 30, and the joining protrusions 54*p* are caught and retained in the joining recesses 64*pa*. As a result, the first exterior member 52 and the second exterior member 62 are kept in the joined state. Then, the cylindrical portion 30*a* is compressed within the waterproofing member split holding surfaces 55*f* and 65*f*, keeping the slits 36 closed.

The wiring module 10 configured in this manner can be used, for example, as wiring for a suspension system in a vehicle, such as wiring for an ABS (anti-lock braking system). Since such wiring can be used outside of the vehicle in environments where it is exposed to water, it is useful to provide an improved waterproofing performance as described above.

According to the wiring module 10 and the elastic waterproofing member 30, a portion in the longitudinal direction of the wiring member 20 is easily accommodated in the penetration accommodating portion 32 via the slits 36. As a result, it is not necessary to insert the wiring member into the through holes in the axial direction, enabling the elastic waterproofing member 30 to be easily attached to the wiring member 20.

Furthermore, the covering member accommodating recess 33 and the plurality of penetration portions 34*a* and 34*b* are formed in the elastic waterproofing member 30. As the slits 36, the base slit portion 37, which extends to the covering member accommodating recess 33, and the plurality of individual slit portions 38*a* and 38*b*, which extend to the respective plurality of penetration portions 34*a* and 34*b*, are formed. As a result, the end 24*a* of the covering member 24 can be accommodated in the covering member accommodating recess 33 via the base slit portion 37. The plurality of linear wiring members 22*a* and 22*b* can be accommodated in the penetration portions 34*a* and 34*b* via the individual slit portions 38*a* and 38*b*, respectively. As a result, in a configuration in which the plurality of linear wiring members 22*a* and 22*b* extend from the covering member 24, the end 24*a* of the covering member 24 can be accommodated in the covering member accommodating recess 33, and the linear wiring members 22*a* and 22*b* can be accommodated in the penetration portions 34*a* and 34*b* through the slits 36. As a result, each of the end 24*a* of the covering member 24 and the plurality of linear wiring members 22*a* and 22*b* of the wiring member 20 can be separately waterproofed. In this case, the ingress of water through the opening of the end 24*a* of the covering member 24 can be effectively inhibited.

Moreover, the deep-side slits 39*a* and 39*b* are formed from the penetration portions 34*a* and 34*b* to the deep-side penetration portions 35*a* and 35*b*. Therefore, the deep-side linear wiring members 23*a* and 23*b* are accommodated in the deep-side penetration portions 35*a* and 35*b* via the individual slit portions 38*a* and 38*b*, the penetration portions 34*a* and 34*b*, and the deep-side slits 39*a* and 39*b*. As a result, it is no longer necessary to form slits that reach the outer periphery of the elastic waterproofing member 30 solely for the deep-side penetration portions 35*a* and 35*b*. In other words, the number of individual slit portions 38*a* and 38*b* open to the outer periphery of the elastic waterproofing member 30 can be reduced relative to the number of the penetration portions 34*a* and 34*b* and the deep-side penetration portions 35*a* and 35*b* formed in the elastic waterproofing member 30. This enhances the waterproofing performance.

Additionally, since the slits 36 are kept closed by accommodating the elastic waterproofing member 30 between the first exterior member 52 and the second exterior member 62 and joining these together, the wiring module 10 can be manufactured easily.

Moreover, when the first exterior member 52 and the second exterior member 62 are joined together, if the elastic waterproofing member 30 is clamped in the direction in which the slits 36 are closed, the slits 36 can be closed more reliably. This improves the waterproofing performance.

Furthermore, it is conceivable that the elastic waterproofing member 30 may not be easily held for at least one of the reasons given below. For example, the elastic waterproofing member 30 may be too small to hold. One example is a case in which the elastic waterproofing member 30 is a cylindrical member without protruding and recessed shapes or surfaces to have a firm grip on. Further, if the elastic waterproofing member 30 is made of a slippery material, such as silicone rubber, it is not easy to hold the elastic waterproofing member 30. In such cases, if the elastic waterproofing member 30 is set on the first exterior member 52, it is easy to hold the elastic waterproofing member 30 together with the first exterior member 52. Additionally, while holding the elastic waterproofing member 30 together with the first exterior member 52, a portion in the longitudinal direction of the wiring member 20 can be pushed into the slits 36 so as to be accommodated in the penetration accommodating portion 32. As a result, the elastic waterproofing member 30 can be easily attached to the wiring member 20.

VARIATIONS

In the above-described embodiment, the wiring member is not required to include a covering member. The wiring member may include only one electric wire. In this case, it is sufficient to form one penetration portion to be penetrated by that one electric wire is provided in the elastic waterproofing member. In this case, all that is required is a single slit formed in the elastic waterproofing member.

In present embodiment, a structure has been described for waterproofing an intermediate portion in the longitudinal direction of the wiring member 20. In particular, a structure has been described for inhibiting the ingress of water through the opening of the end 24a of the covering member 24. The structure for sealing water with this elastic waterproofing member may be used as a waterproofing structure for a connector on an end of the wiring member. In this case, the elastic waterproofing member may also be accommodated in a connector housing.

In the present embodiment, a configuration has been described in which the elastic waterproofing member 30 is accommodated between the first exterior member 52 and the second exterior member 62. The elastic waterproofing member may be configured to be fitted in a recess formed in one member. Any exterior member will be sufficient as long as it can keep the slits 36 closed, such as an adhesive tape wound around and covering the elastic waterproofing member 30, for example.

It should be noted that the configurations described in the foregoing embodiments and the variations can be combined as appropriate as long as they are compatible with one another.

LIST OF REFERENCE NUMERALS

10 Wiring module
20 Wiring member
22 (22a, 22b) Linear wiring member
23 (23a, 23b) Deep-side linear wiring member
24 Covering member
24a End
30 Elastic waterproofing member
30a Cylindrical portion
30b Extension portion
32 Penetration accommodating portion
33 Covering member accommodating recess
33p (34ap, 34bp) Annular protrusion
34 (34a, 34b) Penetration portion
35 (35a, 35b) Deep-side penetration portion
36 Slit
37 Base slit portion
38a, 38b Individual slit portion
39a, 39b Deep-side slit
42 First outer annular protrusion
43 Second outer annular protrusion
44 Set protrusion
44a Base
44b Head
50 Exterior member
52 First exterior member
53 Bottom plate portion
54, 64 Side wall portion
54p Joining protrusion
54q Guide protrusion
55a, 65a First positioning portion
55b Second positioning portion
55c Partition
55f, 65f Waterproofing member split holding surface
56a, 66a Half-cylindrical holding portion
57 Set recess
62 Second exterior member
63 Ceiling plate portion
64p Joining elongated piece
64pa Joining recess
65b Partition wall portion

What is claimed is:

1. A wiring module, comprising:
a wiring member; and
an elastic waterproofing member in which a penetration accommodating portion that is capable of accommodating a portion in a longitudinal direction of the wiring member is formed,
wherein a slit is formed in the elastic waterproofing member from the outer periphery of the elastic waterproofing member to the penetration accommodating portion,
the slit extends in a direction parallel to a central axis of the elastic waterproofing member when viewed from above, and
the slit is kept closed when the portion in the longitudinal direction of the wiring member is accommodated in the penetration accommodating portion through the slit, and
wherein the wiring member includes a linear wiring member and a deep-side linear wiring member,
the penetration accommodating portion includes a penetration portion capable of accommodating a portion in a longitudinal direction of the linear wiring member, and a deep-side penetration portion capable of accommodating a portion in a longitudinal direction of the deep-side linear wiring member,
the slit is formed in a portion from the outer periphery of the elastic waterproofing member to the penetration portion, and
a deep-side slit is formed in the elastic waterproofing member from the penetration portion to the deep-side penetration portion.

2. The wiring module according to claim 1,
wherein the wiring member includes a plurality of linear wiring members and a covering member that covers the plurality of linear wiring members, and the plurality of linear wiring members extend from an end of the covering member,
the penetration accommodating portion includes a covering member accommodating recess that covers the end of the covering member and a plurality of penetration portions continuous with the covering member accommodating recess,
the plurality of penetration portions are provided so as to correspond to the plurality of linear wiring members, and
the slit includes a base slit portion extending from the outer periphery of the elastic waterproofing member to the covering member accommodating recess, and a plurality of individual slit portions that branch off from the base slit portion and extend from the outer periphery of the elastic waterproofing member to the respective plurality of penetration portions.

3. The wiring module according to claim 1, wherein the slit has a Y-shape when viewed from above.

4. A wiring module, comprising:
a wiring member;
an elastic waterproofing member in which a penetration accommodating portion that is capable of accommodating a portion in a longitudinal direction of the wiring member is formed; and
an exterior member including a first exterior member and a second exterior member that are joined together,
wherein, when the first exterior member and the second exterior member are joined together, the elastic waterproofing member is accommodated between the first exterior member and the second exterior member with the slit closed, and
wherein a slit is formed in the elastic waterproofing member from the outer periphery of the elastic waterproofing member to the penetration accommodating portion,
the slit extends in a direction parallel to a central axis of the elastic waterproofing member when viewed from above, and
the slit is kept closed when the portion in the longitudinal direction of the wiring member is accommodated in the penetration accommodating portion through the slit.

5. The wiring module according to claim 4, wherein the elastic waterproofing member is set in the first exterior member with an outward portion of the slit on the outer periphery exposed to the outside from the first exterior member.

6. The wiring module according to claim 4, wherein, when the first exterior member and the second exterior member are joined together, the exterior member exerts a force to clamp the slit in the direction of closure.

7. An elastic waterproofing member attached to a wiring member, the elastic waterproofing member comprising:
a penetration accommodating portion that is capable of accommodating a portion in a longitudinal direction of the wiring member; and
a slit formed from an outer periphery of the elastic waterproofing member to the penetration accommodating portion,
wherein the slit extends in a direction parallel to a central axis of the elastic waterproofing member when viewed from above, and
wherein the penetration accommodating portion includes a penetration portion capable of accommodating a portion in a longitudinal direction of a linear wiring member of the wiring member, and a deep-side penetration portion capable of accommodating a portion in a longitudinal direction of a linear wiring member different from the linear wiring member of the wiring member,
the slit is formed in a portion from the outer periphery to the penetration portion of the elastic waterproofing member, and
a deep-side slit is formed from the penetration portion to the deep-side penetration portion.

8. The elastic waterproofing member according to claim 7,
wherein the penetration accommodating portion includes a covering member accommodating recess that is open to one side and a plurality of penetration portions continuous with a deep side of the covering member accommodating recess, and
the slit includes a base slit portion extending from the outer periphery of the elastic waterproofing member to the covering member accommodating recess, and a plurality of individual slit portions that branch off from the base slit portion and extend from the outer periphery of the elastic waterproofing member to the respective plurality of penetration portions.

9. The elastic waterproofing member according to claim 7, wherein the slit has a Y-shape when viewed from above.

* * * * *